(12) United States Patent
Na et al.

(10) Patent No.: US 10,135,090 B2
(45) Date of Patent: Nov. 20, 2018

(54) METHOD FOR MANUFACTURING ELECTRODE ASSEMBLY

(71) Applicant: LG CHEM, LTD., Seoul (KR)

(72) Inventors: Seung Ho Na, Daejeon (KR); Chang Bum Ahn, Daejeon (KR); Young Joo Yang, Daejeon (KR)

(73) Assignee: LG CHEM, LTD., Seoul (KR)

( * ) Notice: Subject to any disclaimer, the term of this patent is extended or adjusted under 35 U.S.C. 154(b) by 788 days.

(21) Appl. No.: 14/423,792

(22) PCT Filed: Sep. 25, 2014

(86) PCT No.: PCT/KR2014/008921
§ 371 (c)(1),
(2) Date: Feb. 25, 2015

(87) PCT Pub. No.: WO2015/046893
PCT Pub. Date: Apr. 2, 2015

(65) Prior Publication Data
US 2016/0036087 A1  Feb. 4, 2016

(30) Foreign Application Priority Data
Sep. 25, 2013  (KR) .................. 10-2013-0113722

(51) Int. Cl.
H01M 10/04 (2006.01)
H01M 2/16 (2006.01)
(Continued)

(52) U.S. Cl.
CPC ......... *H01M 10/0468* (2013.01); *B32B 37/12* (2013.01); *B32B 38/004* (2013.01);
(Continued)

(58) Field of Classification Search
CPC .......... B32B 2255/26; B32B 2307/202; B32B 2307/206; B32B 2457/10; B32B 37/12;
(Continued)

(56) References Cited

U.S. PATENT DOCUMENTS

2001/0003863 A1   6/2001 Thibault et al.
2001/0036573 A1  11/2001 Jen et al.
(Continued)

FOREIGN PATENT DOCUMENTS

CN   1363123 A    8/2002
CN   102884665 A  1/2013
(Continued)

OTHER PUBLICATIONS

Extended European Search Report for European Application No. 14835648.8, dated Jul. 30, 2015.

*Primary Examiner* — Lingwen R Zeng
(74) *Attorney, Agent, or Firm* — Birch, Stewart, Kolasch & Birch, LLP

(57) ABSTRACT

Provided is an electrode assembly manufacturing method including a radical unit manufacturing stage in which a radical unit having a four-layer structure is manufactured by sequentially stacking a first electrode, a first separator, a second electrode, and a second separator, and a radical unit stacking stage in which the radical unit as a unit is repeatedly stacked to manufacture an electrode assembly, and whenever a predetermined number of radical units are stacked, the radical units are adhered to each other by heating and pressing an outermost one of the radical units.

20 Claims, 11 Drawing Sheets

(51) Int. Cl.
  *B32B 37/12* (2006.01)
  *B32B 38/00* (2006.01)
(52) U.S. Cl.
  CPC ............ *H01M 2/166* (2013.01); *H01M 2/168* (2013.01); *H01M 2/1686* (2013.01); *H01M 10/0413* (2013.01); *H01M 10/0481* (2013.01); *B32B 2255/26* (2013.01); *B32B 2307/202* (2013.01); *B32B 2307/206* (2013.01); *B32B 2457/10* (2013.01); *H01M 2220/20* (2013.01)
(58) Field of Classification Search
  CPC ............ B32B 38/004; H01M 10/0413; H01M 10/0468; H01M 10/0481; H01M 2220/20; H01M 2/166; H01M 2/168; H01M 2/1686
  See application file for complete search history.

(56) References Cited

U.S. PATENT DOCUMENTS

| | | | |
|---|---|---|---|
| 2002/0160258 A1 | 10/2002 | Lee et al. | |
| 2003/0013012 A1 | 1/2003 | Ahn et al. | |
| 2006/0115718 A1* | 6/2006 | Parsian | H01M 10/0525 429/152 |
| 2007/0202382 A1* | 8/2007 | Nakamura | H01M 8/023 429/482 |
| 2009/0017376 A1 | 1/2009 | Yamamura et al. | |
| 2011/0045338 A1* | 2/2011 | Bae | H01M 2/1646 429/144 |
| 2011/0081570 A1 | 4/2011 | Jang et al. | |
| 2012/0225345 A1 | 9/2012 | Kim | |
| 2014/0134472 A1 | 5/2014 | Kim | |
| 2014/0295266 A1 | 10/2014 | Jang et al. | |
| 2014/0349192 A1 | 11/2014 | Park et al. | |
| 2014/0363725 A1 | 12/2014 | Park et al. | |
| 2014/0363727 A1 | 12/2014 | Ko et al. | |
| 2014/0370362 A1 | 12/2014 | Park et al. | |
| 2015/0180082 A1 | 6/2015 | Jung et al. | |

FOREIGN PATENT DOCUMENTS

| | | |
|---|---|---|
| CN | 104170151 A | 11/2014 |
| EP | 2557626 A2 | 2/2013 |
| EP | 2808933 A1 | 12/2014 |
| JP | 2001-357890 A | 12/2001 |
| JP | 2003-523060 A | 7/2003 |
| JP | 2006-185662 A | 7/2006 |
| JP | 2009-38004 A | 2/2009 |
| JP | 2013-524460 A | 6/2013 |
| JP | 2012-526857 A | 9/2015 |
| JP | 2015-527709 A | 9/2015 |
| JP | 2015-531155 A | 10/2015 |
| JP | 2015-532766 A | 11/2015 |
| KR | 10-0497147 B1 | 6/2005 |
| KR | 10-2009-0008085 A | 1/2009 |
| KR | 10-2011-0036245 A | 4/2011 |
| KR | 10-2011-0112241 A | 10/2011 |
| KR | 10-2014-0103088 A | 8/2014 |

* cited by examiner

METHOD FOR MANUFACTURING ELECTRODE ASSEMBLY

TECHNICAL FIELD

The present invention relates to a method for manufacturing an electrode assembly, and more particularly, to an electrode assembly manufacturing method that more efficiently improves stacking stability of a new type of electrode assembly manufactured through only stacking.

BACKGROUND ART

Secondary batteries may be variously classified according to structures of electrode assemblies. For example, secondary batteries may be classified into stack-type batteries, winding-type (jell-roll-type) batteries, and stack/folding-type batteries. In the case of the stack-type batteries, electrode units (a cathode, a separator, and an anode) constituting an electrode assembly are stacked separately from one another. Thus, precise alignment of the electrode assembly may be significantly difficult, and a large number of processes may be needed to produce the electrode assembly. The stack/folding-type batteries may need two lamination apparatuses and a folding apparatus. Thus, a process of manufacturing an electrode assembly of the stack/folding-type batteries may be significantly complicated. In particular, since full cells or bi-cells of the stack/folding-type batteries are stacked through folding, precise alignment of the full cells or the bi-cells may be difficult.

To address these issues, a manufacturing method has been recently suggested, which manufactures an electrode assembly through only stacking, without sacrificing precise alignment thereof, and more efficiently produces electrode assemblies. However, when the manufacturing method is used to manufacture an electrode assembly, it may be needed to fix radical units constituting the electrode assembly to each other to improve stacking stability. To this end, a method of using a fixing tape has been suggested (refer to patent document D1).

However, when the fixing tape is used, the fixing tape itself is needed and may be detached after fixing the radical units. In addition, the fixing tape should be accurately attached to a desired area and may increase the thickness of the electrode assembly so as to degrade capacity efficiency thereof.

CITED DOCUMENT

[Patent Document 1] Korean Patent Application No. 10-2013-0016514

DISCLOSURE OF THE INVENTION

Technical Problem

Accordingly, the present invention aims at providing an electrode assembly manufacturing method that more efficiently improves stacking stability of a new type of electrode assembly manufactured through only stacking.

Technical Solution

According to an aspect of the present invention, there is provided an electrode assembly manufacturing method including: a radical unit manufacturing stage in which a radical unit having a four-layer structure is manufactured by sequentially stacking a first electrode, a first separator, a second electrode, and a second separator, and a radical unit stacking stage in which the radical unit as a unit is repeatedly stacked to manufacture an electrode assembly; and whenever a predetermined number of radical units are stacked, the radical units are adhered to each other by heating and pressing an outermost one of the radical units.

Advantageous Effects

An electrode assembly manufacturing method according to the present invention adheres radical units to each other by heating and pressing a new type of electrode assembly that is manufactured through only stacking, thus more efficiently improving stacking stability of the electrode assembly.

MODE FOR CARRYING OUT THE INVENTION

Figure 1:
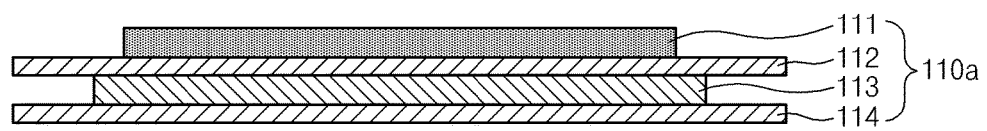
FIG. 1 is a side view illustrating a first structure of a radical unit according to the present invention.

Hereinafter, preferred embodiments of the present invention will be described in detail with reference to the accompanying drawings. However, the present invention is not limited to the following embodiments.

An electrode assembly manufacturing method according to an embodiment of the present invention includes a radical unit manufacturing stage in which a radical unit is manufactured, and a radical unit stacking stage in which: the radical unit is repeatedly stacked to form an electrode assembly; and whenever a predetermined number of radical units are stacked, the radical units are adhered to each other.

The radical unit manufacturing stage will now be described. A radical unit 110 is manufactured by sequentially stacking a first electrode 111, a first separator 112, a second electrode 113, and a second separator 114. As such, the radical unit 110 basically has a four-layer structure. In more particular, referring to FIG. 1, a radical unit 110a may be formed by sequentially stacking the first electrode 110, the first separator 112, the second electrode 113, and the second separator 114 from the upper side of the radical unit 110a to the lower side thereof. Alternatively, referring to FIG. 2, a radical unit 110b may be formed by sequentially stacking the first electrode 111, the first separator 112, the second electrode 113, and the second separator 114 from the lower side of the radical unit 110b to the upper side thereof. The pole of the first electrode 111 is opposite to the pole of the second electrode 113. For example, when the first electrode 111 is a cathode, the second electrode 113 is an anode.

Figure 3:
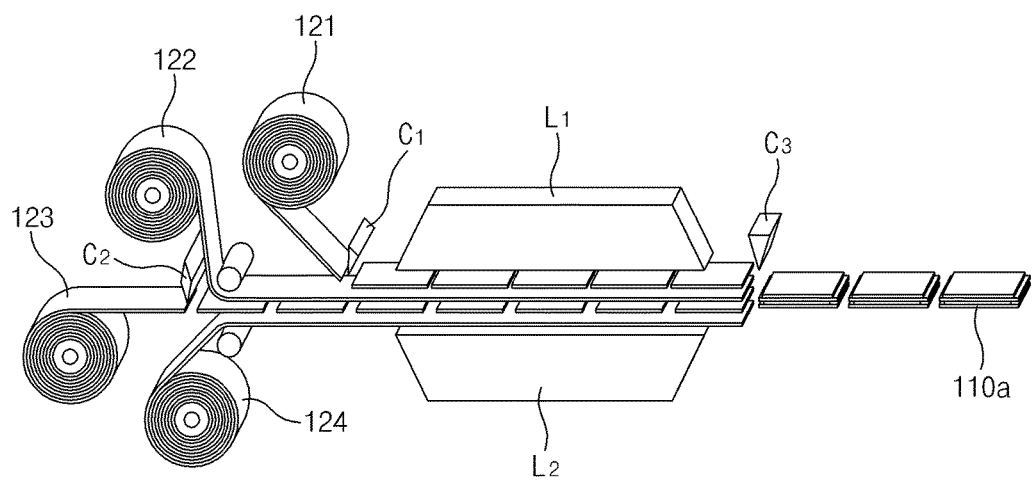
FIG. 3 is a view illustrating a process of manufacturing radical units according to the present invention.

The radical unit 110 may be manufactured through the following processes (refer to FIG. 3). First, a first electrode raw material 121, a first separator raw material 122, a second electrode raw material 123, and a second separator raw material 124 are prepared. After the first and second electrode raw materials 121 and 123 and the first and second separator raw materials 122 and 124 are prepared, the first electrode raw material 121 is cut to a predetermined size using a cutter C1. The second electrode raw material 123 is also cut to a predetermined size using a cutter C2. Then, the first electrode raw material 121 having the predetermined size is placed as a layer on the first separator raw material 122, and the second electrode raw material 123 having the predetermined size is placed as a layer on the second separator raw material 124.

After that, the first and second electrode raw materials 121 and 123 and the first and second separator raw materials 122 and 124 are supplied to laminators L1 and L2. The laminators L1 and L2 press electrode raw materials and separator raw materials, or heat and press the electrode raw materials and the separator raw materials to adhere the electrode raw materials and the separator raw materials to one another. Such an adhering process further facilitates the stacking the radical units in the radical unit stacking stage. In addition, the adhering process facilitates alignment of the electrode assembly. After the adhesion, the first separator raw material 122 and the second separator raw material 124 are cut to a predetermined size using a cutter C3 to manufacture the radical unit 110.

A surface of a separator (a separator raw material) may be coated with a coating material having adhesive force. The coating material may be a mixture of inorganic particles and a binder polymer. The inorganic particles may improve thermal stability of the separator. That is, the inorganic particles may prevent the separator from contracting at a high temperature.

The binder polymer may fix the inorganic particles. Accordingly, the inorganic particles may form a porous structure in a coating layer of the separator. The porous structure may provide excellent ion permeability to the separator (although the separator has the coating layer). The binder polymer may improve mechanical stability of the separator by fixing the inorganic particles to the separator. Furthermore, the binder polymer may more stably adhere the separator to an electrode (which is called safety-reinforcing separator (SRS) coating). For reference, the separator may be formed of a polyolefin-based separator base material.

Figure 2:
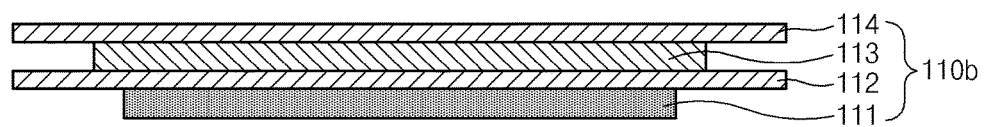
FIG. 2 is a side view illustrating a second structure of a radical unit according to the present invention.

Referring to FIGS. 1 and 2, the first and second electrodes 111 and 113 are disposed on both side surfaces of the first separator 112, and the second electrode 113 is disposed on only one surface of the second separator 114. Thus, both the surfaces of the first separator 112 may be coated with a coating material, and only the surface of the second separator 114 may be coated with the coating material. That is, both the surfaces of the first separator 112, which face the first and second electrodes 111 and 113, may be coated with the coating material, and only the surface of the second separator 114, which faces the second electrode 113, may be coated with the coating material.

However, radical units 110 may be adhered to each other, which will be described later, and thus, both surfaces of the second separator 114 may be coated with the coating material. That is, the surface of the second separator 114 facing the second electrode 113, and the opposite surface of the second separator 114 thereto may be coated with the coating material.

For reference, the radical unit 110 may not have the four-layer structure. For example, the radical unit 110 may have an eight-layer structure formed by sequentially stacking the first electrode 111, the first separator 112, the second electrode 113, the second separator 114, the first electrode 111, the first separator 112, the second electrode 113, and the second separator 114. That is, the radical unit 110 may have a structure formed by repeatedly stacking the four-layer structure.

Figure 4:
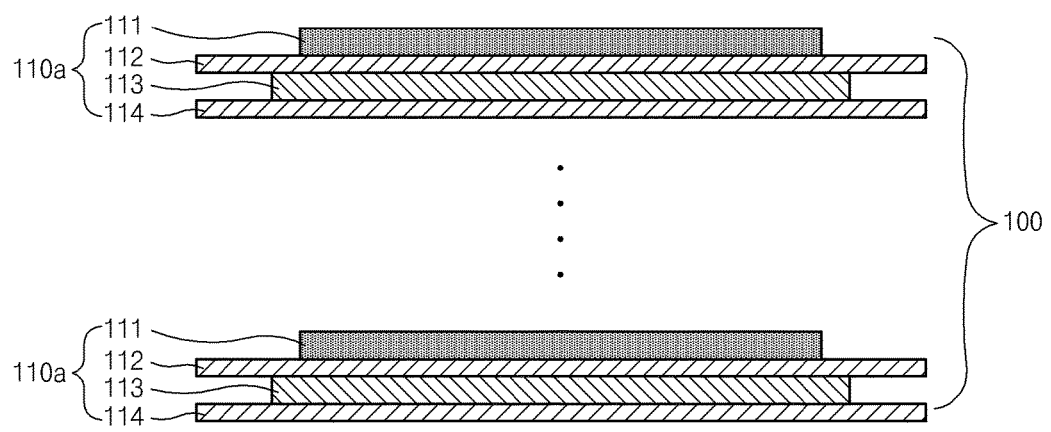
FIG. 4 is a side view illustrating an electrode assembly manufactured by stacking radical units according to the present invention.

The radical unit stacking stage will now be described. Referring to FIG. 4, an electrode assembly 100 according to the current embodiment (which includes an auxiliary unit that will be described later) is manufactured by stacking at least two radical units 110a. When the radical units 110a are stacked, each of the radical units 110a is a unit. That is, the electrode assembly 100 is manufactured by repeatedly stacking the radical unit 110a manufactured in the radical unit manufacturing stage. Accordingly, the radical units 110 can be very accurately aligned, and be more efficiently produced.

However, since the radical units 110 of the electrode assembly 100 may be detached from each other, the radical unit 110 may be fixed to ensure stacking stability. To this end, after all the radical units 110 are stacked to manufacture the electrode assembly 100, a heating press may press the electrode assembly 100 from the upper and lower sides of the electrode assembly 100.

However, when the electrode assembly 100 is thick, heat transfer to the central part of the electrode assembly 100 may be difficult. In this case, adhesion between the radical units 110 in the central part of the electrode assembly 100 may be difficult. To prevent this issue, the electrode assembly 100 may be pressed at a high temperature. In this case, a separator may be deformed in an outer part of the electrode assembly 100 to which the high temperature is directly applied.

Figure 5:
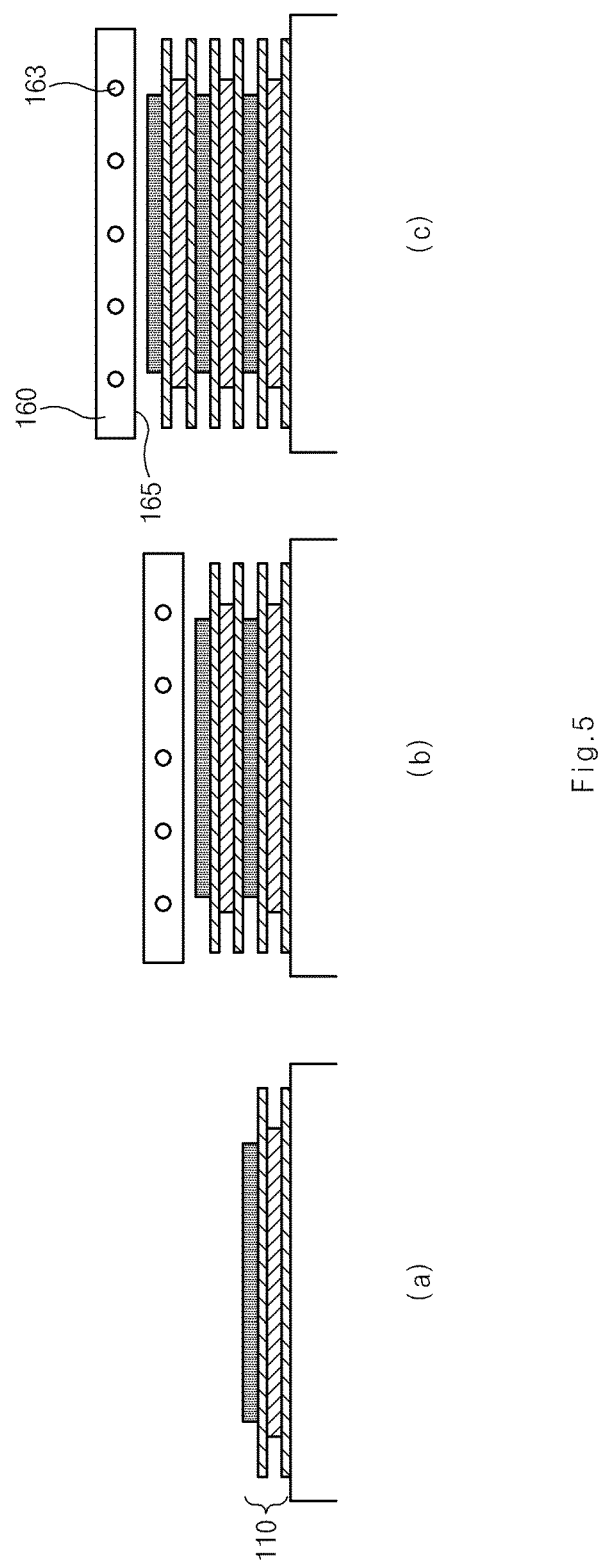
FIG. 5 is side views illustrating a concept that an electrode assembly is heated and pressed using a heating press according to the present invention.

To prevent this issue, in the electrode assembly manufacturing method according to the current embodiment, whenever a predetermined number of radical units are stacked, the radical units are adhered to one another by heating and pressing an outermost one of the radical units. That is, referring to FIG. 5, for example, whenever one of the radical units 110 is stacked, a heating press 160 may press the radical unit 110 from the upper side of the radical unit 110. A period in which the heating press 160 presses the radical unit 110 may be appropriately determined according to heat transfer. That is, whenever two or more of the radical units 110 are stacked, the heating press 160 may press the radical units 110, provided that heat can be sufficiently transferred down to the inside of the radical units 110.

As such, when the radical units 110 are heated and pressed, the radical units 110 may be adhered to each other. For such adhesion, both the surfaces of the second separator 114 may be coated with the coating material having adhesive force, as described above. The heating press 160 may include a heater 163 therein for heating.

The heating press 160 may have a pressing surface 165 having a shape corresponding to the shape of a flat end surface of the radical units 110. In this case, the radical units 110 can be more efficiently pressed, without sacrificing the alignment of the radical units 110.

This will now be described in more detail. Electrodes and separators generally have a rectangular shape. Thus, the flat end surface of the radical units 110 may be rectangular. When the pressing surface 165 of the heating press 160 is rectangular to correspond to the flat end surface of the radical units 110, the heating press 160 presses the whole of the radical unit 110. That is, the heating press 160 is in surface contact with the radical unit 110 while the heating press 160 presses the radical unit 110. Accordingly, the heating press 160 presses the radical unit 110, without sacrificing the alignment of the radical units 110. Unlike this, if a roll is used to press the radical unit 110, the radical units 110 may be misaligned. This is because the roll should gradually move from an edge of the radical unit 110 to the opposite edge thereof to press the radical unit 110.

At least, the pressing surface 165 may be greater than electrodes. Electrodes may be smaller than separators for electrical insulation. Thus, when the pressing surface 165 is greater than electrodes, the pressing surface 165 may simultaneously press the whole of adhesion surfaces between the electrodes and separators.

The heating press 160 may press the radical unit 110 at a pressure ranging from about 50 kgf/cm$^2$ to about 100 kgf/cm$^2$. If the heating press 160 presses the radical unit 110 at a pressure lower than about 50 kgf/cm$^2$, adhesion between a separator and an electrode of the radical unit 110 may be difficult. In addition, even when the separator and the electrode are adhered to each other, the separator and the electrode may be easily detached from each other. If the heating press 160 presses the radical unit 110 at a pressure higher than about 100 kgf/cm$^2$, a separator of the radical unit 110 may be damaged.

The heating press 160 may press the radical unit 110 heated to a temperature ranging from about 80° C. to about 100° C. If the heating press 160 presses the radical unit 110 at a temperature lower than about 80° C., adhesion between a separator and an electrode of the radical unit 110 may be difficult. In addition, even when the separator and the electrode are adhered to each other, the separator and the electrode may be easily detached from each other. If the heating press 160 presses the radical unit 110 at a temperature higher than about 100° C., pores of a separator of the radical unit 110 may be clogged.

The heating press 160 may press the radical unit 110 for about 1 second to about 3 seconds. If the heating press 160 presses the radical unit 110 for a time shorter than about 1 second, adhesion between a separator and an electrode of the radical unit 110 may be difficult. In addition, even when the separator and the electrode are adhered to each other, the separator and the electrode may be easily detached from each other. If the heating press 160 presses the radical unit 110 for a time longer than about 3 seconds, a production tact time may be increased.

The electrode assembly 100 may further include at least one of a first auxiliary unit 130 and a second auxiliary unit 140. That is, in the radical unit stacking stage, at least one of the first auxiliary unit 130 and the second auxiliary unit 140 may be further disposed as a layer in the electrode assembly 100. In this case, an auxiliary unit may be disposed after all radical units are stacked. Alternatively, the radical units may be sequentially stacked on the auxiliary unit.

First, the first auxiliary unit 130 will now be described. The radical unit 110 is formed by sequentially stacking the first electrode 111, the first separator 112, the second electrode 113, and the second separator 114. Thus, a first electrode 116 (referred to as "a first distal end electrode" hereinafter) is disposed on the uppermost or lowermost side of the electrode assembly 100 formed by stacking the radical units 110. The first auxiliary unit 130 is additionally disposed as a layer on the first distal end electrode 116 (which may be a cathode or an anode).

Figure 6:
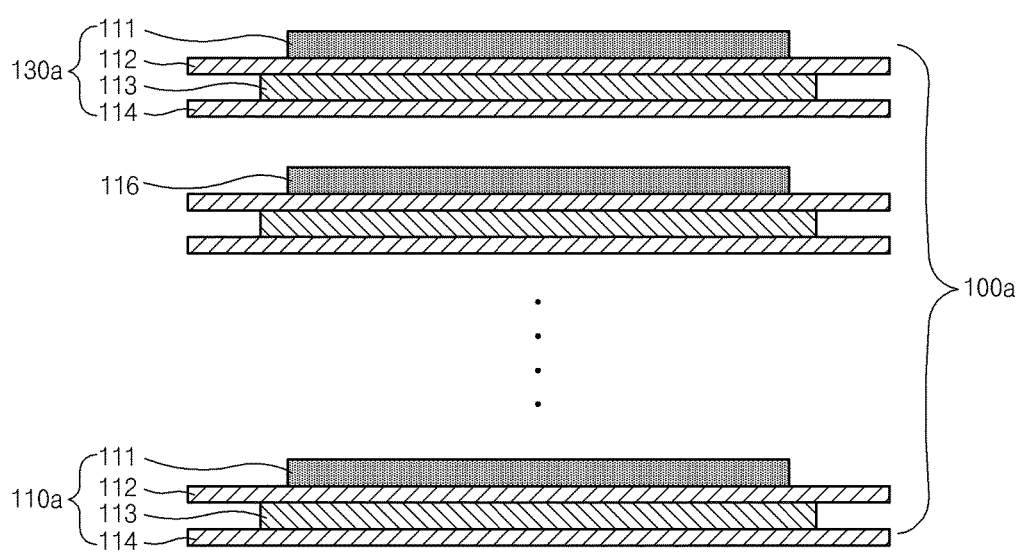
FIG. 6 is a side view illustrating a first structure of an electrode assembly including radical units and a first auxiliary unit according to the present invention.
Figure 7:
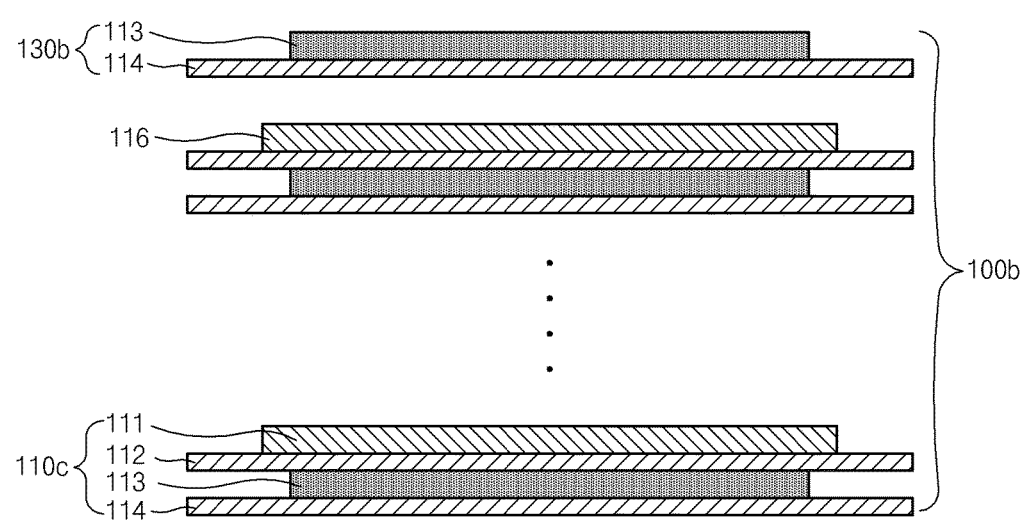
FIG. 7 is a side view illustrating a second structure of an electrode assembly including radical units and a first auxiliary unit according to the present invention.

In more particular, referring to FIG. 6, when a first electrode 111 is a cathode and a second electrode 113 is an anode, a first auxiliary unit 130a may be formed by sequentially stacking a separator 114, an anode 113, a separator 112, and a cathode 111 from a first distal end electrode 116, that is, outwardly from the first distal end electrode 116 (to the upper side of FIG. 6). In addition, referring to FIG. 7, when a first electrode 111 is an anode and a second electrode 113 is a cathode, a first auxiliary unit 130b may be formed by sequentially stacking a separator 114 and a cathode 113 from a first distal end electrode 116, that is, outwardly from the first distal end electrode 116. Referring to FIG. 6 or 7, a cathode may be disposed on an outermost side of the electrode assembly 100 adjacent to the first distal end electrode 116, by using the first auxiliary unit 130.

An electrode may include a collector and an active material layer that is applied to both surfaces of the collector. Accordingly, referring to FIG. 6, an active material layer of a cathode disposed under a collector reacts with an active material layer of an anode disposed above a collector, through a separator. When radical units 110 are formed in the same manner and are then sequentially stacked to form an electrode assembly 100, both surfaces of a collector of a first distal end electrode disposed on the uppermost or lowermost side of the electrode assembly 100 are provided with active material layers, like first electrodes. However, in this case, the active material layer of the first distal end electrode disposed at an outside of the electrode assembly 100 does not react with another active material layer, which causes a waste of active material layers.

Such an issue is addressed using the first auxiliary unit 130. That is, the first auxiliary unit 130 is formed separately from the radical units 110. Thus, the first auxiliary unit 130 may include a cathode having a collector, only a surface of which is coated with an active material layer. That is, a cathode of the first auxiliary unit 130 may include a collector, and only one surface of the collector facing the radical units 110 (only a surface facing the lower side of FIG. 6) may be coated with an active material layer.

As a result, when a first auxiliary unit 130 is disposed on a first distal end electrode 116 to form an electrode assembly 100, a cathode, only one surface of which is coated, may be disposed on an outermost side of the first distal end electrode 116, thus preventing a waste of active material layers. In addition, since a cathode is a configuration for discharging, for example, nickel ions, when the cathode is disposed on the outermost side of an electrode assembly, battery capacity is improved.

Next, the second auxiliary unit 140 will now be described. The second auxiliary unit 140 basically performs the same function as that of the first auxiliary unit 130. In more particular, a radical unit 110 is formed by sequentially stacking a first electrode 111, a first separator 112, a second electrode 113, and a second separator 114 from the upper side of the radical unit 110 to the lower side, or from the lower side of the radical unit 110 to the upper side. Thus, a second separator 117 (referred to as "a second distal end separator" hereinafter) is disposed on the uppermost or lowermost side of the electrode assembly 100 formed by stacking the radical units 110 The second auxiliary unit 140 is additionally disposed as a layer on the second distal end separator 117.

Figure 8:
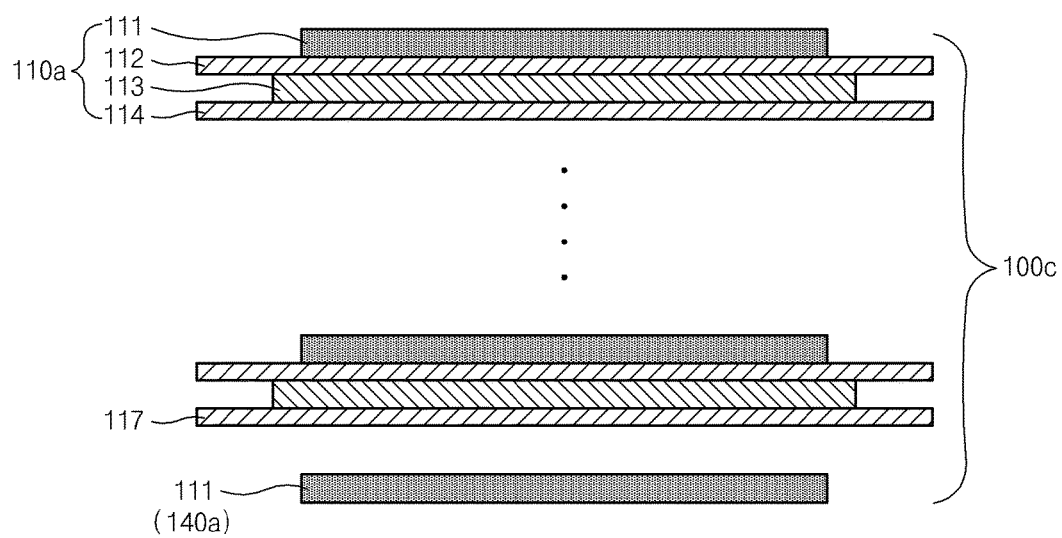
FIG. 8 is a side view illustrating a third structure of an electrode assembly including radical units and a second auxiliary unit according to the present invention.
Figure 9:
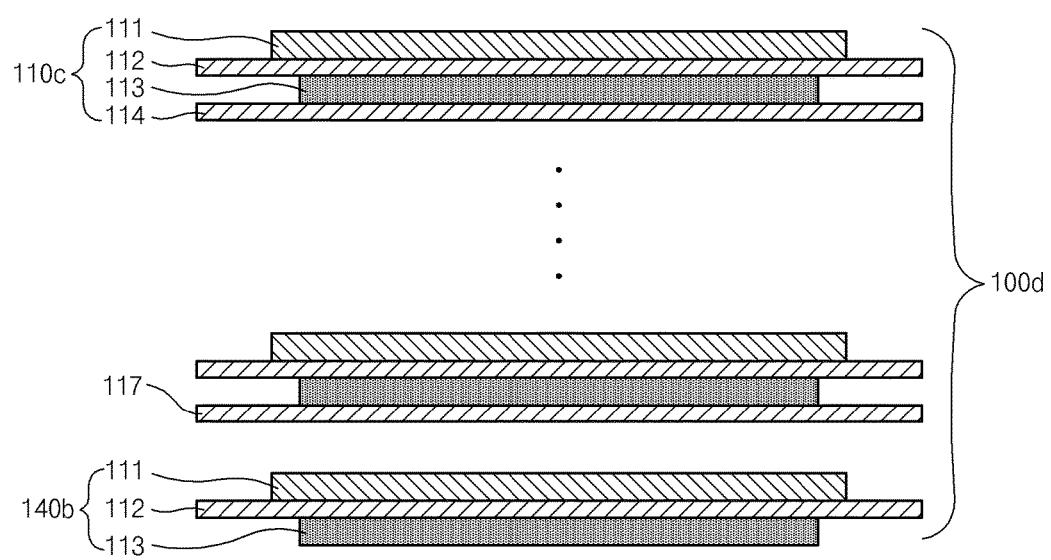
FIG. 9 is a side view illustrating a fourth structure of an electrode assembly including radical units and a second auxiliary unit according to the present invention.

In more particular, referring to FIG. 8, when a first electrode 111 is a cathode, and a second electrode 113 is an anode, a second auxiliary unit 140a may be formed as a cathode 111. In addition, referring to FIG. 9, when a first electrode 111 is an anode and a second electrode 113 is a cathode, a second auxiliary unit 140b may be formed by sequentially stacking an anode 111, a separator 112, and a cathode 113 from a second distal end separator 117, that is, outwardly from the second distal end separator 117. Like the first auxiliary unit 130, a cathode of the second auxiliary unit 140 may include a collector, and only one surface of the collector facing the radical units 110 (only a surface facing the upper side of FIG. 9) may be coated with an active material layer. As a result, when a second auxiliary unit 140 is disposed on a second distal end separator 117 to form an electrode assembly 100, a cathode, only one surface of which is coated, may be disposed on an outermost side of the second distal end separator 117.

The first auxiliary unit 130 and the second auxiliary unit 140 may further include a separator on an outermost side thereof, if necessary. For example, when a cathode disposed on the outermost side of the first auxiliary unit 130 and the second auxiliary unit 140 is needed to be electrically insulated from a case, the first auxiliary unit 130 and the second auxiliary unit 140 may further include a separator on an outermost side of the cathode. For a same reason, referring to FIG. 8, a separator may be further provided on a cathode exposed on a side of an electrode assembly 100 opposite to a second auxiliary unit 140, that is, on the uppermost side of an electrode assembly as illustrated in FIG. 8.

Figure 10:
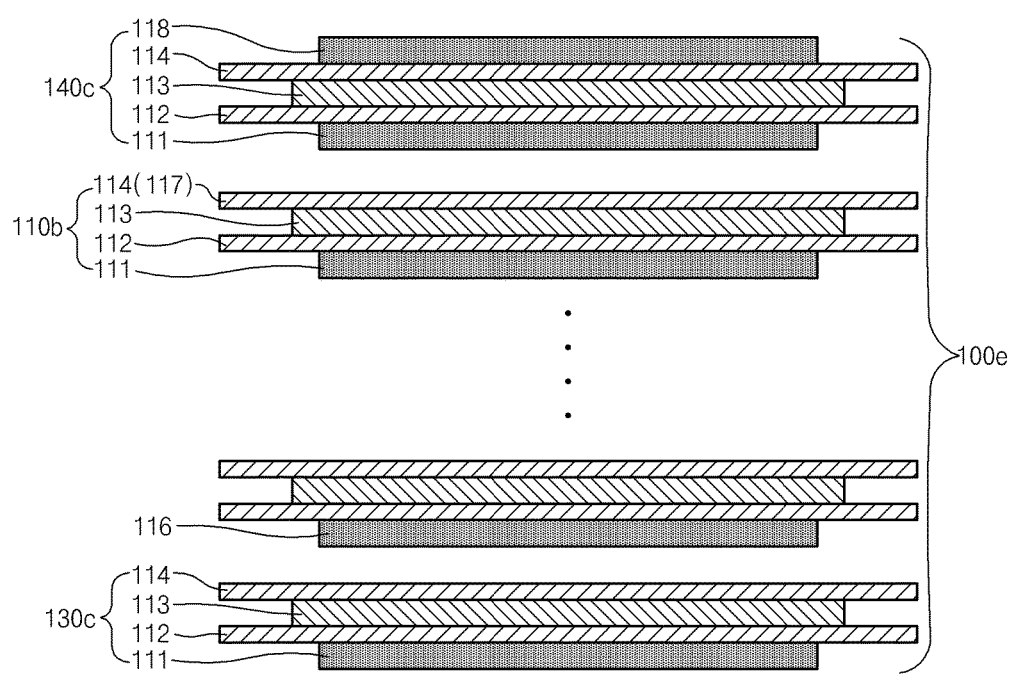
FIG. 10 is a side view illustrating a fifth structure of an electrode assembly including radical units and first and second auxiliary units according to the present invention.
Figure 11:
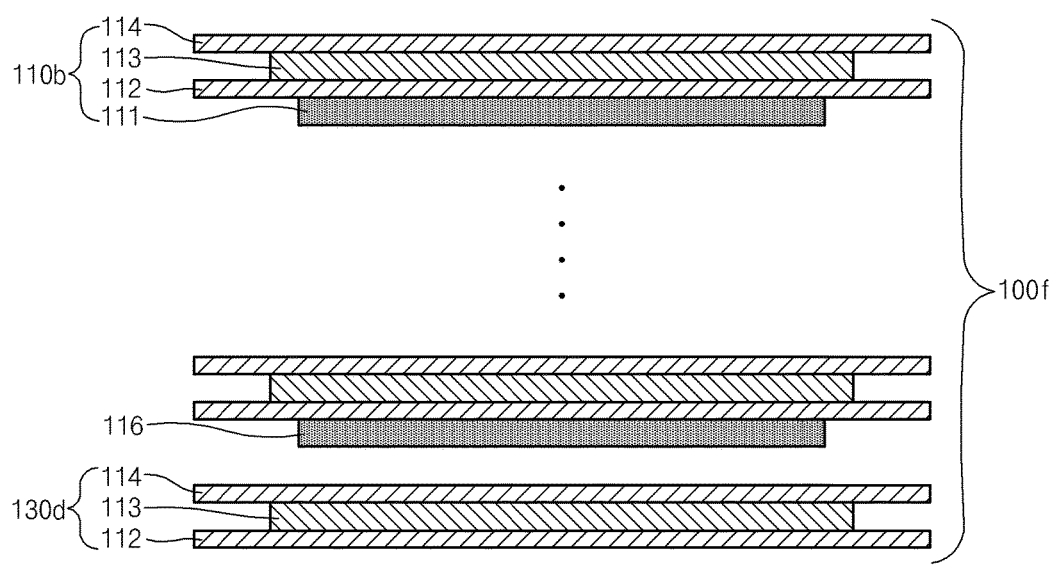
FIG. 11 is a side view illustrating a sixth structure of an electrode assembly including radical units and a first auxiliary unit according to the present invention.
Figure 12:
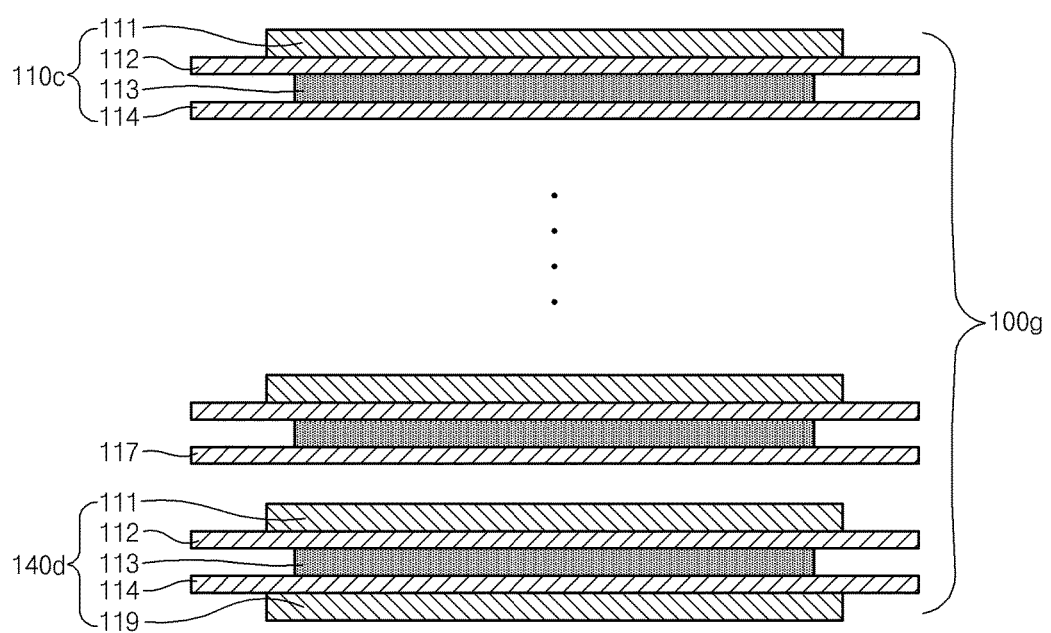
FIG. 12 is a side view illustrating a seventh structure of an electrode assembly including radical units and a second auxiliary unit according to the present invention.

Referring to FIGS. 10 to 12, an electrode assembly may be formed. First, referring to FIG. 10, an electrode assembly 100e may be formed. A radical unit 110b may be formed by sequentially stacking a first electrode 111, a first separator 112, a second electrode 113, and a second separator 114 from the lower side of the radical unit 110b to the upper side thereof. The first electrode 111 may be a cathode, and the second electrode 113 may be an anode. A first auxiliary unit 130c may be formed by sequentially stacking a separator 114, an anode 113, a separator 112, and a cathode 111 from a first distal end electrode 116, that is, from the upper side of FIG. 10 to the lower side thereof. An active material layer may be formed on only a surface of the cathode 111 of the first auxiliary unit 130c facing the radical unit 110b.

A second auxiliary unit 140c may be formed by sequentially stacking a cathode 111 (a first cathode), a separator 112, an anode 113, a separator 114, and a cathode 118 (a second cathode) from a second distal end separator 117. The cathode 118 (the second cathode) of the second auxiliary unit 140c, which is disposed an outermost side thereof, may include an active material layer on only a surface facing the radical unit 110b. For reference, an auxiliary unit including a separator facilitates alignment of units.

Next, referring to FIG. 11, an electrode assembly 100f may be formed. A radical unit 110b may be formed by sequentially stacking a first electrode 111, a first separator 112, a second electrode 113, and a second separator 114 from the lower side of the radical unit 110b to the upper side thereof. The first electrode 111 may be a cathode, and the second electrode 113 may be an anode. A first auxiliary unit 130d may be formed by sequentially stacking a separator 114, an anode 113, and a separator 112 from a first distal end electrode 116. In this case, a second auxiliary unit may not be provided. For reference, an anode may react with an aluminum layer of an electrode case due to a potential difference therebetween. Thus, the anode may be insulated from the electrode case by a separator.

Finally, referring to FIG. 12, an electrode assembly 100g may be formed. A radical unit 110c may be formed by sequentially stacking a first electrode 111, a first separator 112, a second electrode 113, and a second separator 114 from the upper side of the radical unit 110c to the lower side thereof. The first electrode 111 may be an anode, and the second electrode 113 may be a cathode. A second auxiliary unit 140d may be formed by sequentially stacking an anode 111, a separator 112, a cathode 113, a separator 114, and an anode 119 from a second distal end separator 117. In this case, a first auxiliary unit may not be provided.

The invention claimed is:

1. An electrode assembly manufacturing method comprising:
   a radical unit manufacturing stage in which a radical unit having a four-layer structure is manufactured by sequentially stacking a first electrode, a first separator, a second electrode, and a second separator, and
   a radical unit stacking stage in which the radical unit as a unit is repeatedly stacked to manufacture an electrode assembly; and whenever a predetermined number of radical units are stacked, the radical units are adhered to each other by heating and pressing an outermost one of the radical units,
   wherein the radical unit stacking stage is repeated at least twice such that, whenever the predetermined number of radical units are stacked, the radical units are adhered to each other by heating and pressing the outermost one of the radical units.

2. The method of claim 1, wherein in the radical unit stacking stage, whenever the predetermined number of the radical units are stacked, a heating press presses the uppermost one of the radical units from the upper side thereof.

3. The method of claim 2, wherein the heating press has a pressing surface having a shape corresponding to the shape of a flat end surface of the radical unit.

4. The method of claim 2, wherein the heating press presses the radical unit at a pressure ranging from 50 kgf/cm2 to 100 kgf/cm2.

5. The method of claim 2, wherein the heating press presses the radical unit heated to a temperature ranging from 80° C. to 100° C.

6. The method of claim 2, wherein the heating press presses the radical unit for 1 second to 3 seconds.

7. The method of claim 1, wherein in the radical unit manufacturing stage, the radical unit is manufactured by adhering the first and second electrodes and the first and second separators to one another.

8. The method of claim 7, wherein in the radical unit manufacturing stage, the radical unit is manufactured by adhering the first and second electrodes and the first and second separators to one another through laminating.

9. The method of claim 7, wherein a surface of the first and second separators is coated with a coating material having adhesive force.

10. The method of claim 9, wherein the coating material comprises a mixture of inorganic particles and a binder polymer.

11. The method of claim 9, wherein both surfaces of the first separator facing the first electrode and the second electrode are coated with the coating material, and a surface of the second separator facing the second electrode and a surface thereof opposite to the first surface are coated with the coating material.

12. The method of claim 1, wherein in the radical unit manufacturing stage, the radical unit is manufactured by repeatedly stacking the four-layer structure.

13. The method of claim 1, wherein in the radical unit stacking stage, a first auxiliary unit is disposed as a layer on a first distal end electrode as the first electrode disposed on the uppermost or lowermost side of the electrode assembly, and
when the first electrode is a cathode, and the second electrode is an anode, the first auxiliary unit is formed by sequentially stacking a separator, an anode, and a separator from the first distal end electrode.

14. The method of claim 1, wherein in the radical unit manufacturing stage, the radical unit is manufactured by adhering the first and second electrodes and the first and second separators to one another through laminating,
wherein the radical units are adhered to each other by heating and pressing the outermost one of the radical units by a heating press that presses the uppermost one of the radical units from the upper side thereof for 1 second to 3 seconds.

15. The method of claim 1, wherein in the radical unit stacking stage, a first auxiliary unit is disposed as a layer on a first distal end electrode as the first electrode disposed on the uppermost or lowermost side of the electrode assembly, and
when the first electrode is a cathode, and the second electrode is an anode, the first auxiliary unit is formed by sequentially stacking a separator, an anode, a separator, and a cathode from the first distal end electrode, and
when the first electrode is an anode, and the second electrode is a cathode, the first auxiliary unit is formed by sequentially stacking a separator and a cathode from the first distal end electrode.

16. The method of claim 15, wherein the cathode of the first auxiliary unit comprises a collector and an active material applied to only one surface of both surfaces of the collector, the one surface facing the radical units.

17. The method of claim 1, wherein in the radical unit stacking stage, a second auxiliary unit is disposed as a layer on a second distal end separator as the second separator disposed on the uppermost or lowermost side of the electrode assembly, and
when the first electrode is a cathode, and the second electrode is an anode, the second auxiliary unit is formed as a cathode, and
when the first electrode is an anode, and the second electrode is a cathode, the second auxiliary unit is formed by sequentially stacking an anode, a separator, and a cathode from the second distal end separator.

18. The method of claim 17, wherein the cathode of the second auxiliary unit comprises a collector and an active material applied to only one surface of both surfaces of the collector, the one surface facing the radical units.

19. The method of claim 1, wherein in the radical unit stacking stage, a second auxiliary unit is disposed as a layer on a second distal end separator as the second separator disposed on the uppermost or lowermost side of the electrode assembly, and
when the first electrode is a cathode, and the second electrode is an anode, the second auxiliary unit is formed by sequentially stacking a first cathode, a separator, an anode, a separator, and a second cathode from the second distal end separator, and
the second cathode of the second auxiliary unit comprises a collector and an active material applied to only one surface of both surfaces of the collector, the one surface facing the radical units.

20. The method of claim 1, wherein in the radical unit stacking stage, a second auxiliary unit is disposed as a layer on a second distal end separator as the second separator disposed on the uppermost or lowermost side of the electrode assembly, and
when the first electrode is an anode, and the second electrode is a cathode, the second auxiliary unit is formed by sequentially stacking an anode, a separator, a cathode, a separator, and an anode from the second distal end separator.

* * * * *